United States Patent [19]
Yano et al.

[11] Patent Number: 4,723,135
[45] Date of Patent: Feb. 2, 1988

[54] PRINTER USING INK BALLS

[75] Inventors: Takeshi Yano; Kazuaki Utsumi, both of Tokyo, Japan

[73] Assignee: NEC Corporation, Japan

[21] Appl. No.: 9,732

[22] Filed: Feb. 2, 1987

[30] Foreign Application Priority Data

Feb. 3, 1986 [JP] Japan .................................. 61-22285
Jun. 24, 1986 [JP] Japan .................................. 61-148584
Jun. 24, 1986 [JP] Japan .................................. 61-148585

[51] Int. Cl.[4] .............................................. G01D 15/16
[52] U.S. Cl. .................................. 346/140 R; 400/118
[58] Field of Search ..................... 346/140 R, 140 PD; 400/118

[56] References Cited

U.S. PATENT DOCUMENTS 3,946,398 3/1976 Kyser et al. .
4,329,070 5/1982 Landa .................................. 400/118

FOREIGN PATENT DOCUMENTS 0116162 7/1983 Japan ............................ 346/140 PD

*Primary Examiner*—Clifford C. Shaw
*Assistant Examiner*—Mark Reinhart
*Attorney, Agent, or Firm*—Ostrolenk, Faber, Gerb & Soffen

[57] ABSTRACT

A printer using ink balls includes ink balls, an injection pipe, an ink ball driving mechanism, a force applying mechanism, and a heating unit. The ink balls are made of an ink material and having a spherical shape at room temperature. The injection pipe injects said ink balls. The ball driving mechanism supplies each ink ball to a predetermined injection position in the injection pipe. The flying force applying mechanism applies a force to cause said ink ball located at the predetermined injection position to fly in response to a drive signal representing a printing timing. The heating unit heats and melts said flying ink ball.

14 Claims, 7 Drawing Figures

PRINTER USING INK BALLS

BACKGROUND OF THE INVENTION

The present invention relates to a printer for performing printing by using solid granular ink balls.

Ink jet printers have been used in practice as output devices in data processing systems. Ink jet printers have advantages in that high-speed printing can be performed with little noise, complicated procedures such as development and fixing are not required, and a full-color image can be easily produced.

In a conventional ink jet printer using a liquid ink, an ink is solidified at a nozzle and the nozzle clogs with the solidified ink. In order to prevent solidification of the ink, an ink having a low viscosity may be used. However, a printed image with such an ink blurs, which causes the degradation of the image quality.

SUMMARY OF THE INVENTION

It is an object of the present invention to provide a printer for performing printing by using small solid granular ink balls in order to eliminate the conventional drawback described above.

A printer using ink balls according to the present invention comprises ink balls made of an ink material and having a spherical shape at room temperature, an injection pipe for injecting each ink ball, means for supplying each ink ball to a predetermined injection position in the injection pipe, means for applying a force to cause the ink ball located at the predetermined injection position to fly in response to a drive signal representing a printing timing, and heating means for heating and melting the flying ink ball.

DETAILED DESCRIPTION OF THE PREFERRED EMBODIMENTS

The present invention will be described in detail with reference to the accompanying drawings.

Figure 1:
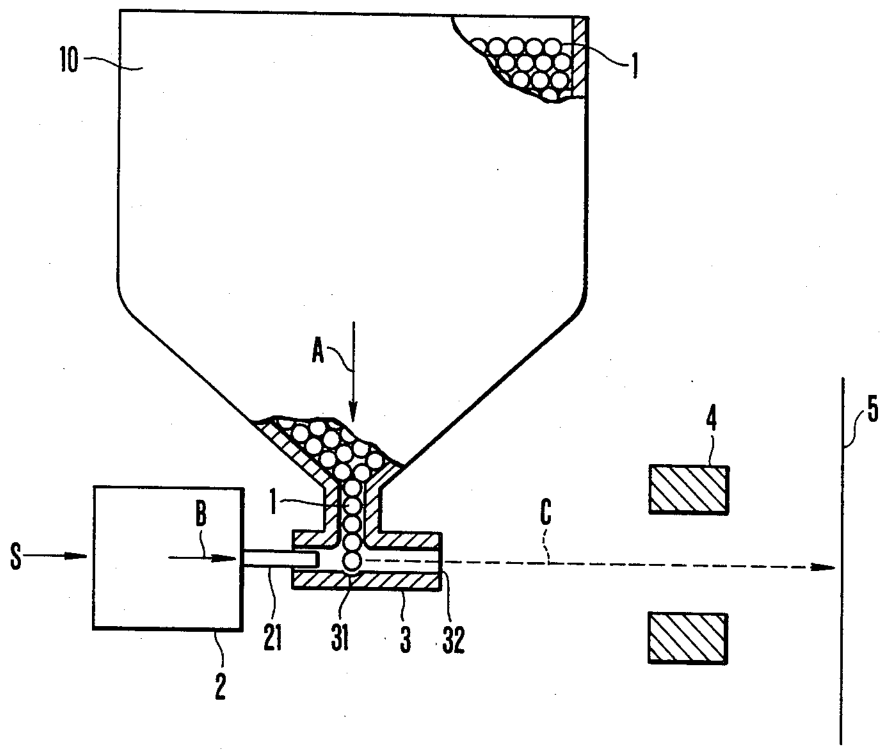
FIG. 1 is a side view showing the main part of a printer according to an embodiment of the present invention.

FIG. 1 is a side view for explaining a printer according to an embodiment of the present invention.

Ink balls 1 are made of an ink material molded in a spherical shape. The ink material is solid at room temperature. When the ink material is heated, it is melted and liquefied. The ink balls are stored in a hopper 10, and the bottom portion of the hopper 10 has a funnel shape. An injection pipe 3 is connected to the outlet port of the bottom of the hopper 10. The inner diameter of the hopper 10 near the outlet port is determined such that the ink balls 1 are dropped in line through the injection pipe 3. A recess 31 is formed in the injection pipe 3 to prevent the lowermost ink ball 1 from being slid through the injection pipe 3 by the weight of the upper balls moving along a direction indicated by arrow A. A hammer pin 21 of a driving mechanism 2 is axially and reciprocally fitted in the injection pipe 3 at a position opposite to a nozzle 32 thereof. The hammer pin 21 is moved toward the nozzle 32 in a direction of arrow B in response to a drive signal S supplied from a controller (not shown) to the driving mechanism 2. However, if the drive signal S is not supplied to the driving mechanism 2, the hammer pin 21 retracts toward the driving mechanism 2. Printing paper 5 is disposed at a position on a line extending along an axis C of the injection pipe 3 such that the surface of printing paper 5 is aligned in a direction perpendicular to the axis C. A heater 4 is arranged in front of the paper 5 and comprises, e.g., electric heating elements interposing the axis C therebetween.

The operation of the printer shown in FIG. 1 will be described below.

The ink ball 1 supplied from the hopper 10 to the injection pipe 3 receives a striking force from the hammer pin 21 moved along the direction of arrow B and flies toward the paper 5, as indicated by arrow C. The flying ink ball 1 receives heat from the heater 4 and is melted and liquefied. The melted ink reaches the paper 5 and is printed as a dot.

Meanwhile, the hammer pin 21 returns to the initial position in the injection pipe 3. The next ink ball 1 drops into the recess 31 and waits for the next printing timing.

In this embodiment, the supply structure for the ink balls 1 can be achieved by a simple structure wherein the funnel pipe at the bottom portion of the hopper 10 is connected to the injection pipe 3 and the ink balls 1 smoothly drop to the injection position one by one. A swinging mechanism may be arranged to slightly vibrate the hopper 10 so as to prevent clogging of the ink balls 1 in the hopper 10.

The driving mechanism 2, the injection pipe 3, and the heater 4 may be integrally formed to constitute a printing head. In the same manner as in the conventional printer, a printing head feed mechanism and a paper feed mechanism are arranged to print a predetermined printing pattern in cooperation with the printing head.

Figure 2:
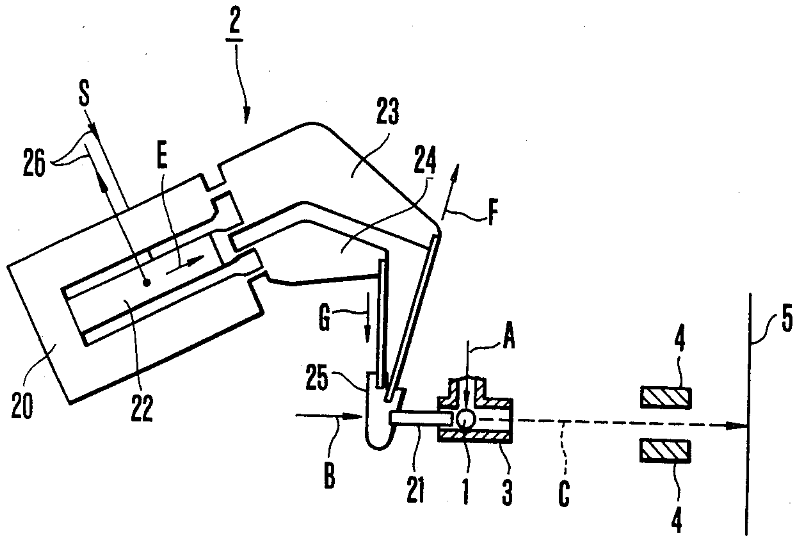
FIG. 2 is a side view showing a driving mechanism of the printer shown in FIG. 1.

FIG. 2 is a side view showing a structure of the driving mechanism 2 shown in FIG. 1. The driving mechanism 2 comprises a base 20, a piezoelectric element 22, one end of which is mounted on the base 20, levers 23 and 24 each having one end connected to the base 20 and the piezoelectric element 22 through hinges (not shown), a lever 25 connected to other end of each of the levers 23 and 24 through a hinge (not shown), and the hammer pin 21 extending from the lever 25. The piezoelectric element 22 is connected to a controller (not shown) through lines 26 and receives the drive signal S from the controller.

The drive signal S is an electrical signal representing a printing timing. In response to the drive signal S, the piezoelectric element 22 is subjected to a dimensional distortion on the basis of an electrostrictive effect and is extended along a direction indicated by arrow E. The dimensional distortion is transmitted to the levers 23 and 24. The levers 23 and 24 receive opposite forces rotational about the hinges connected to the base 20. The distal ends of the levers 23 and 24 are displaced in directions indicated by arrows F and G, respectively. These displacements are transmitted to the lever 25 through the corresponding hinges. The hammer pin 21 extending from the lever 25 is displaced in a direction indicated by arrow B.

As a result, the hammer pin 21 applies a striking force to the ink ball 1 supplied in the direction of arrow A in the injection pipe 3.

A drive source in the driving mechanism 2 in this embodiment is the piezoelectric element 22 and can be driven repeatedly for a very short duration. In addition, the electrostrictive effect is utilized, and thus an electric-mechanical conversion coefficient is large. As compared with, e.g., an electromagnetic actuator, high energy conversion efficiency can be obtained. The dimensional distortion generated by the drive source at the time of printing is amplified by the levers 23, 24 and 25, and the amplified distortion is transmitted to the hammer pin 21, thereby obtaining a striking stroke sufficient enough to cause the ink ball 1 to fly.

Figure 3:
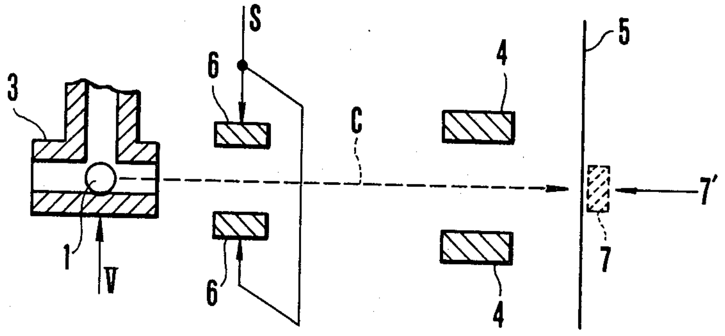
FIG. 3 is a side view showing the main part of a printer according to another embodiment of the present invention.

FIG. 3 is a side view showing another embodiment of the present invention. Instead of using the driving mechanism 2 (FIG. 1) having the mechanical hammer pin 21, each ink ball 1 is electrically charged. The charged ink ball 1 is attracted by drive electrodes 6 to apply a force thereto at the time of printing. An injection pipe 3 is made of a conductive pipe, and a charging voltage V is applied thereto, thereby charging the ink ball 1 supplied thereto. At the time of printing, a drive signal representing a voltage with a polarity for attracting the ink ball 1 is applied across the drive electrodes 6 until the charged ink ball 1 passes between the drive electrodes 6. The ink ball 1 passing between the drive electrodes 6 flies in a direction of a broken line indicated by arrow C. The ink ball 1 passes through a heater 4 and is heated and melted. The melted ink ball reaches paper 5 and forms a dot. A platen electrode 7 may be arranged behind the paper 5 to further accelerate the ink ball 1 having passed between the drive electrodes 6. An acceleration voltage 7' is applied to the platen electrode 7.

Figure 4:
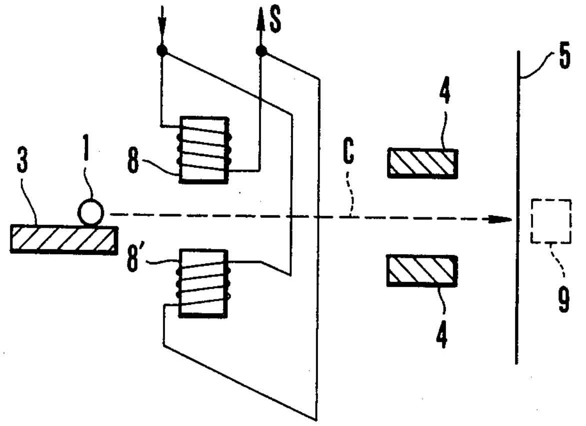
FIG. 4 is a side view showing the main part of a printer according to still another embodiment of the present invention.

FIG. 4 is a side view showing still another embodiment of the present invention. In this embodiment, electromagnets 8 and 8' are arranged to apply a force to an ink ball 1. A magnetic powder is mixed in the ink ball 1. A magnetic field is generated between the electromagnets 8 and 8' in response to a drive signal so as to apply an attraction force to the ink ball 1 until the ink ball passes between the electromagnets 8 and 8'. A platen electrode 9 may be arranged behind the paper 5 to further accelerate the ink ball 1 having passed between the electromagnets 8 and 8' so as to give an attraction force to the flying ink ball 1.

Figure 5A:
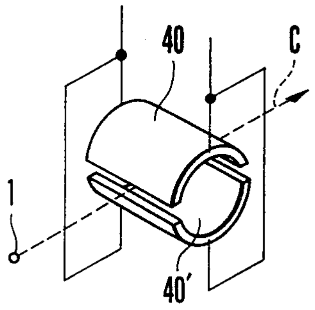
FIGS. 5A, 5B, and 5C are views for explaining different heaters in the printers shown in FIGS. 1, 3, and 4.
Figure 5B:
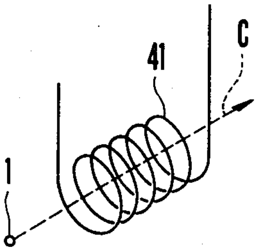
Figure 5C:
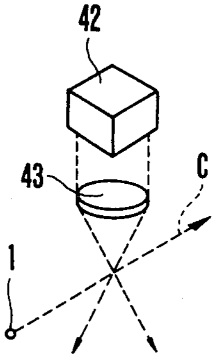

FIGS. 5A, 5B, and 5C are perspective views showing the structures of heaters 4 in the embodiments of FIGS. 1 and 3. FIG. 5A shows a heater comprising electrical heating elements 40 and 40' of a semispherical shape. A power source is connected to both ends of each of the electrical heating elements 40 and 40', and the heating elements 40 and 40' are heated. The flying direction C of the ink ball 1 is aligned with the axis of the heater constituted by the heating elements 40 and 40'. Heat radiated from the heating elements 40 and 40' is concentrated at the center of the cylindrical heater, so that the flying ink ball 1 can be effectively heated.

FIG. 5B shows an inductive heater. An RF current is supplied to a coil 41 having its axis aligned with the flying direction C of the ink ball 1. The flying ball 1 is heated due to dielectric loss and is then melted.

FIG. 5C shows a structure wherein an infrared ray emitted from a light-emitting diode (LED) 42 is focused by a lens 43, and the infrared ray is concentrated on a track corresponding to the flying direction C of the ink ball 1. A laser diode may be used as the light-emitting element. The light-emitting element may be intermittently turned on at a timing when the ink ball 1 passes through the infrared ray spot.

In each embodiment, it is essential that the ink ball 1 is melted by heat and contains a material which has an adhesion property with paper. The ink ball comprises a mixture of such a meltable material and a dye or pigment.

Examples of the meltable material are: a thermoplastic polymeric resin such as an acrylic polymeric material, PVB, PVA, polyethylene, polypropylene, polystyrene, and polyamide; a thermosetting resin represented by an epoxy resin; a polymeric hydrocarbon compound; a polymeric aliphatic compound; and a wax-based compound. An organic or inorganic dye or pigment may be used. In addition, a metal pigment may also be used.

The meltable material was an acrylic polymeric resin and the pigment was carbon black for preparing ink balls. By using these ink balls and the hammer pin as the driving member of the first embodiment, good printing quality can be obtained. The particle size of the ink ball was 50 $\mu$m.

The meltable material was an epoxy resin and the coloring material was a diazo dye to prepare ink balls having a particle size of 100 $\mu$m. A charge driving system was employed using the above ink balls. Thus, good printing quality can be obtained.

The meltable material was a wax-based material and the pigment was ferrite powder to prepare ink balls. An electromagnetic driving system was employed using the above ink balls. Thus, good printing quality was obtained. In this case, the ink ball had a particle size of 10 $\mu$m.

According to the present invention as described above, by using small solid ink balls, an ink ball printing system provides high-quality printing and eliminates an operation failure caused by solidification of the ink and blurring caused by using an ink having a low viscosity in the conventional ink jet printing systems.

What is claimed is:

1. A printer using ink balls comprising ink balls made of an ink material and having a spherical shape at room temperature, an injection pipe for injecting each ink ball, means for supplying said each ink ball to a predetermined injection position in said injection pipe, means for applying a force to cause said each ink ball located at the predetermined injection position to fly in response to a drive signal representing a printing timing, and heating means for heating and melting said each flying ink ball.

2. A printer according to claim 1, wherein said ink ball supplying means comprises a hopper having a volume enough to store a predetermined number of ink balls and a funnel shape, said hopper being provided with a bottom outlet port coupled to said injection pipe and being arranged such that a portion thereof near said bottom outlet port causes the ink balls to align in line and to drop into said injection pipe at the predetermined injection position.

3. A printer according to claim 2, wherein a recess is formed in an inner surface of said injection pipe at the predetermined injection position, and the dropping ink ball is fitted in said recess even if a downward urging force is applied thereto.

4. A printer according to claim 2, further comprising means for swinging said hopper.

5. A printer according to claim 1, wherein said means for applying the force to said ink ball comprises a hammer pin reciprocally inserted in said injection pipe from a side opposite to a nozzle of said injection pipe so as to strike the ink ball located at the predetermined injection position, and a driving unit for driving said hammer pin in a direction toward said nozzle of said injection pipe in response to the drive signal.

6. A printer according to claim 5, wherein said driving unit comprises a piezoelectric element, one end of which is supported by a base and the other end of which generates dimensional distortion on the basis of an electrostrictive effect, and a mechanism for amplifying and converting motion of the other end of said piezoelectric element into the striking force of the hammer pin.

7. A printer according to claim 6, wherein said amplifying and converting means comprises at least one lever, one end of which is connected to said base and the other end of said piezoelectric element through hinges, and the other end of which is connected to said hammer pin.

8. A printer according to claim 1, wherein said means for applying the force to said ink ball comprises means for electrically charging the ink ball at the predetermined injection position, and driving electrodes arranged between said nozzle of said injection pipe and said heating means, said driving electrodes being adapted to attract the charged ink ball in response to the drive signal.

9. A printer according to claim 8, further comprising an acceleration electrode arranged behind the printing paper.

10. A printer according to claim 1, wherein said ink ball is obtained by mixing a magnetic powder therein, and said means for applying the force to said ink ball comprises electromagnets arranged between said nozzle of said injection pipe and said heating means, said electromagnets being energized in response to the drive signal.

11. A printer according to claim 10, further comprising an acceleration electrode arranged behind the printing paper.

12. A printer according to claim 1, wherein said heating means comprises an electric heater.

13. A printer according to claim 1, wherein said heating means comprises an induction heater.

14. A printer according to claim 1, wherein said heating means comprises a light-emitting element and an optical system for focusing an infrared ray from said light-emitting element on a track of the flying ink ball.

* * * * *